US 8,849,285 B2

(12) United States Patent
Lin et al.

(10) Patent No.: US 8,849,285 B2
(45) Date of Patent: Sep. 30, 2014

(54) METHOD FOR REDUCING THE HANDOVER FREQUENCY BY A COMMUNICATION DEVICE IN FEMTOCELL NETWORKS

(75) Inventors: Phone Lin, Taipei (TW); Chia-Peng Lee, Taipei (TW); Chin-Liang Wang, Hsinchu (TW); Whai-En Chen, I-Lan (TW)

(73) Assignee: National Tsing Hua University, Hsin Chu (TW)

( * ) Notice: Subject to any disclaimer, the term of this patent is extended or adjusted under 35 U.S.C. 154(b) by 299 days.

(21) Appl. No.: 13/426,607

(22) Filed: Mar. 22, 2012

(65) Prior Publication Data

US 2013/0045745 A1  Feb. 21, 2013

(30) Foreign Application Priority Data

Aug. 18, 2011  (TW) .............................. 100129639 A

(51) Int. Cl.
*H04W 36/00* (2009.01)
*H04W 84/04* (2009.01)

(52) U.S. Cl.
CPC ........ *H04W 36/0083* (2013.01); *H04W 84/045* (2013.01)
USPC ......... 455/437; 455/434; 455/435.2; 455/444

(58) Field of Classification Search
USPC ................. 455/436, 437, 444, 450, 453, 434, 455/435.2, 67.11, 67.13, 226.2
See application file for complete search history.

(56) References Cited

U.S. PATENT DOCUMENTS

| 8,331,939 B2 * | 12/2012 | Chen ............................. 455/436 |
| 2009/0092097 A1 * | 4/2009 | Nylander et al. ............. 370/331 |
| 2011/0159880 A1 * | 6/2011 | Kumar et al. ................. 455/450 |
| 2013/0157652 A1 * | 6/2013 | Khaitan et al. ............. 455/422.1 |
| 2014/0031041 A1 * | 1/2014 | Jung et al. ..................... 455/437 |

* cited by examiner

*Primary Examiner* — Temica M Beamer
(74) *Attorney, Agent, or Firm* — Chih Feng Yeh; Huntington IP Consulting Co., Ltd.

(57) ABSTRACT

A method for reducing the handover frequency by a communication device in femtocell networks includes the steps: measuring the radio signal strength by a communication device and storing the information of the serving base station into a cache memory; checking whether the stored information in the cache memory is classified as "femtocell" or not; if so, deleting the macrocell's information from the measurement report by the communication device and transmitting this to the serving base station; when the radio link failure occurred, checking whether the stored information in the cache memory is classified as "femtocell" or not; if so, initiating a timer; detecting an available femtocell before the timer expires; transmitting a call reestablishment request message to the available femtocell for rebuilding the link.

13 Claims, 5 Drawing Sheets

METHOD FOR REDUCING THE HANDOVER FREQUENCY BY A COMMUNICATION DEVICE IN FEMTOCELL NETWORKS

CROSS-REFERENCE TO RELATED APPLICATION

This application claims the benefit of TAIWAN patent application no. 100129639, filed Aug. 18, 2011, which is hereby incorporated by reference herein in its entirely and made a part of this specification.

TECHNICAL FIELD

The present invention relates to a communication method, and more specifically to a method for reducing the handover frequency in femtocell networks.

BACKGROUND OF THE RELATED ART

With the rapid development in communication technology, the cell phone (or mobile phone) has gradually become an indispensable necessity of life. Developed and intensive communication base station network are facilitating for popularity of mobile phones. By means of the base station, mobile phones can link to a communication networks to communicate with others.

In general, base station includes femtocell and macrocell. The femtocell is referred to as a home base station with small coverage which is mainly used to cover the areas without covered by the other base station and to improve data transmission rate. It is typically used for residential or small business environment. The macrocell has more coverage for service which can provide uninterrupted service to users, but with slower transmission rate. By contrast, the femtocell has less coverage for service and discontinuously, but with faster transmission rate. Therefore, within coverage of the femtocell, it is easier using to users for transmission, to facilitate improving the transmission rate, and quality of call. As an user moves from a femtocell to another femtocell, the communication device locates within service coverage of the macrocell for a time period. In the existing mobile management mechanisms, in order to maintain uninterrupted call (conversation), the communication devices will associate with the macrocell (macro cellular base station) to establish a radio link. Generally speaking, such mechanisms are referred as to handoff or handover.

As mentioned above, when the communication device conducts voice or data services, during a femtocell moving to another femtocell, the communication device will locate within service coverage of the macrocell for a time period. Once, the macrocell currently has no extra radio resources, services being carried out by the communication devices will be forced to interrupt such that it substantially lowers user satisfaction. On the other hand, if the communication device can smoothly switch to the macrocell, the communication device may also stay in a short time, and immediately handover to the femtocell to enhance the quality of transmission. While, this situation will make communication devices to conduct high frequency of handover. Thus, it will increase the delay time caused by switching cells, which makes a serious decrease in quality of call.

To sum up, the disadvantage of these traditional handover operations, includes burden of the cost of processing, communication delay, and the communications disconnection and many other shortcomings. When the cells number increases, the frequency of handover operations of each cell will also increase, as seriously, even leading to communication networks shut down. Therefore, it is a very important key point to the development of network communications that how to design an effective handover management mechanism to reduce the probability of dropped calls, reduce the delay time as required frequency by switching cells and increase the overall capacity of network services.

SUMMARY

To address the above issues, the present invention provides a method for effectively reducing the handover frequency in communication networks.

One objective of the present invention is to utilize a mechanism for reducing the handover frequency such that a macrocell has extra bandwidth (radio resource) to serve more users.

Yet another objective of the present invention is to reduce the handover frequency in femto networks for eliminating delay time of switching cells to promote quality of call.

Thus, one objective of the present invention is to promote the femtocell usage frequency for further promoting data transmission rate of a communication device and quality of call.

To achieve the purpose of the above-mentioned, the present invention proposes a method for reducing the handover frequency in femtocell networks, comprising: firstly, detecting periodically radio signals strength of a cell by a communication device, and storing an information of a service cell to a cache memory of said communication device, wherein the service cell is radio linking with the communication device. Next, confirming whether the information stored in the cache memory is classified as femtocell information or not, if so, then modifying a measurement report by the communication device, and deleting at least one macrocell information to be measured, and sending the measurement report to the service cell. If a call termination occurs, then confirming by the communication device whether the information stored in the cache memory is classified as femtocell information, if so, then initialing a timer by the communication device. Subsequently, before the timer expires, detecting whether exists an available femtocell by the communication device, if so, sending a call re-establishment request message to said available femtocell by said communication device for re-establishing a call.

As above-mentioned, one feature of the present invention is that a cache memory and a timer are added into the communication device, and a newly algorithm may be utilized to suspend the relocation procedure. The cache memory is used to store a service cell information with radio linking the communication device. The timer may be used to suspend the occurrence of relocation mechanism as the communication device is out the service range of the service cell, and confirming whether exists available femtocells for serving the communication device or not. If so, communication services are processed by the service cell, and without relocating to a macrocell. Therefore, the present invention can reduce effectively the handover frequency from the communication device to the macrocell, and thereby reducing bandwidth burden of the macrocell, reducing delay time caused by handovers and promoting data transmission rate and quality of call.

To further understand technical contents and methods of the present invention, please refer to the following detailed description and drawings related the present invention.

BRIEF DESCRIPTION OF THE DRAWINGS

The invention is more fully appreciated in connection with the following detailed description taken in conjunction with the accompanying drawings; however, those skilled in the art will appreciate that these examples are not intended to limit the scope of the present invention, and various changes and modifications are possible within the spirit and scope of the present invention.

DETAILED DESCRIPTION

The present invention and embodiments are now described in detail. In the diagrams and descriptions below, the same symbols are utilized to represent the same or similar elements. The possible embodiments of the present invention are described in illustrations.

The communication device as described below comprises mobile phone, PDA, smart phone but not limited these mobile communication devices which are compatible with various protocols, for example W-CDMA, CDMA2000, CDMA2001, TD-CDMA, TD-SCDMA, UWC0136, DECT, 3G, 4G system, etc.

Figure 1:
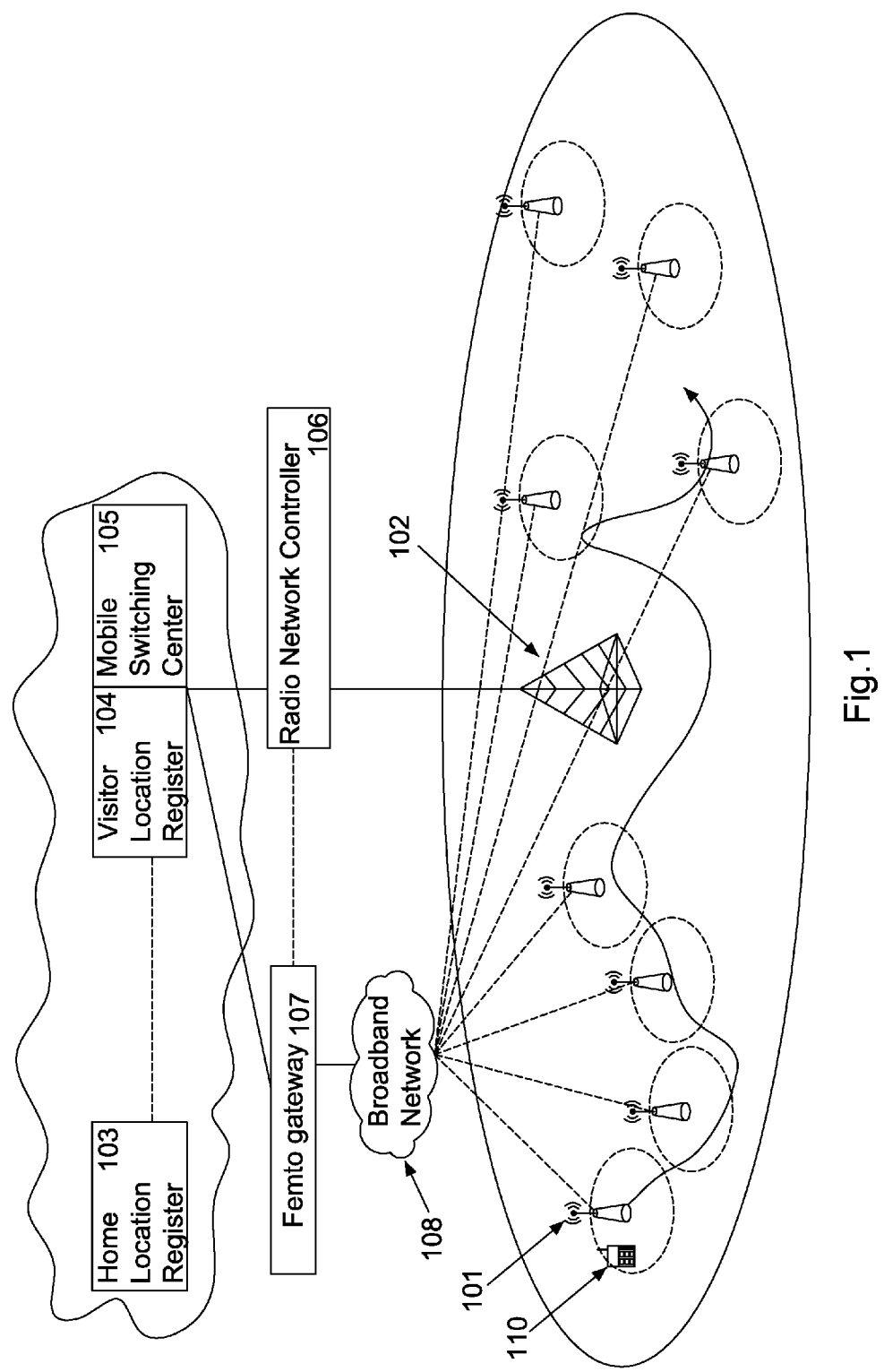
FIG. 1 shows an embodiment of a femto network architecture of the present invention.

Referring to FIG. 1, it shows an embodiment of a femto network architecture of the present invention. A core network comprises Home Location Register (HLR) 103, Visitor Location Register (VLR) 104, and Mobile Switching Center (MSC) 105. In general, function between the Visitor Location Register (VLR) 104 and the Mobile Switching Center (MSC) 105 is inseparable. For example, the Mobile Switching Center (MSC) 105 may be used to query the Visitor Location Register (VLR) 104 about Temporary Mobile Subscriber Identity (TMSI) information of the mobile device. Therefore, the Visitor Location Register (VLR) 104 and the Mobile Switching Center (MSC) 105 are generally built together, and connecting with the Home Location Register (HLR) 103 by a network for facilitating information exchange. Moreover, a call signal may be linked to Public Switched Telephone Network (PSTN) by the Mobile Switching Center (MSC) 105. Radio Network Controller (RNC) 106 may be connected to the Visitor Location Register (VLR) 104 and the Mobile Switching Center (MSC) 105 to manage radio resource for allocating resources to the relevant macrocell (base station) 102. For example, when a communication device 109 requires relocation, the Radio Network Controller (RNC) 106 will request the macrocell 102 for retaining resource to provide the communication device 109 to talk. A femto gateway 107 is connected to the Visitor Location Register (VLR) 104 and the Mobile Switching Center (MSC) 105 to manage and allocate resources to a plurality of femtocells 101 but not the macrocell 102. In one embodiment, the femto gateway 107 is connected to the femtocells 101 through a broadband network (internet) 108. In one embodiment, when the communication device conducts a handover procedure, the Radio Network Controller (RNC) 106 and the femto gateway 107 manage radio resource of the macrocell 102 and the femtocells 101 respectively, for facilitating transferring radio uplink signals from the femtocells 101 to the macrocell 102 to complete the handover mechanism.

Figure 2:
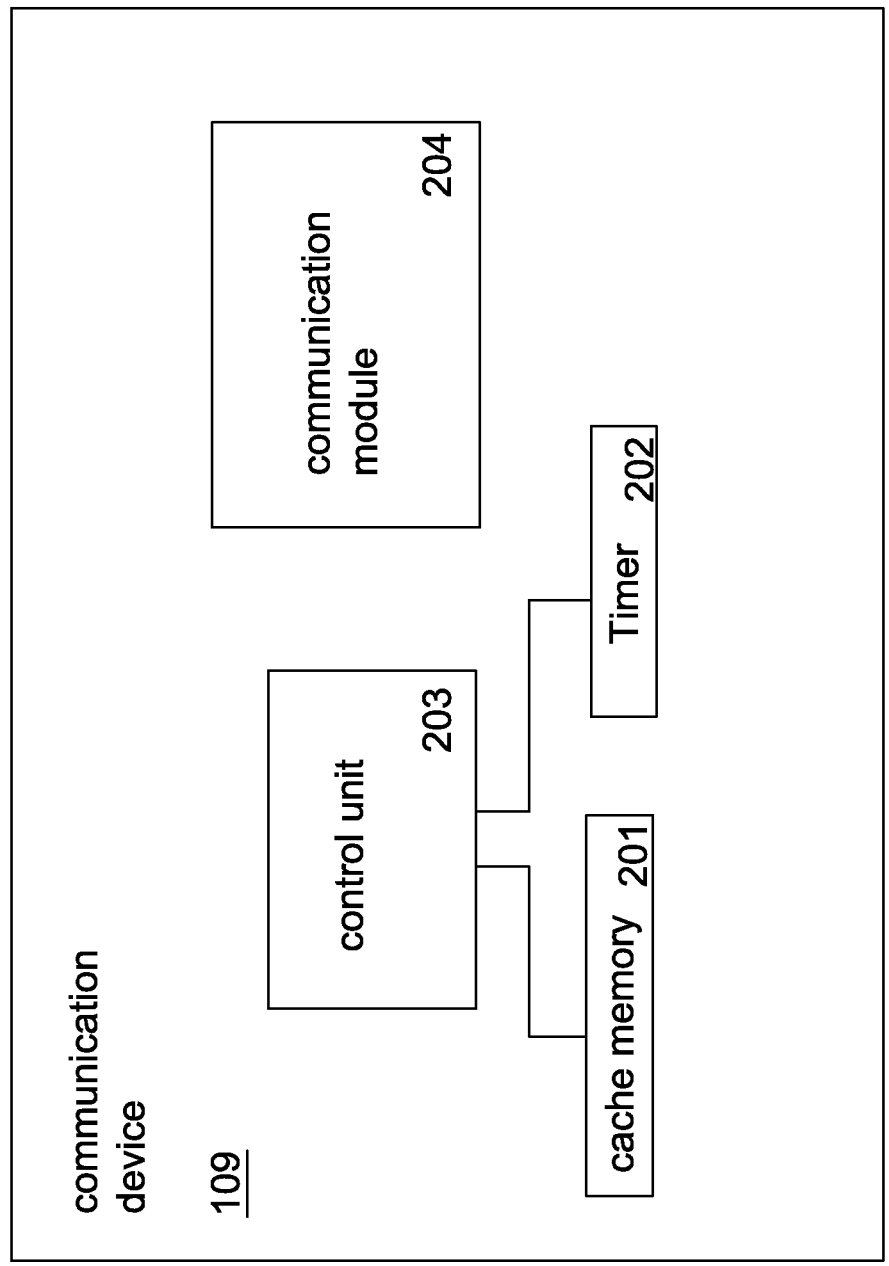
FIG. 2 shows a preferred embodiment of a communication device of the present invention.

Referring to FIG. 2, it shows a preferred embodiment of a communication device of the present invention. As shown in FIG. 2, the communication device 109 comprises a control unit 203, which is coupled to a cache memory 201, a timer 202 and a communication module 204, respectively. In this embodiment, the cache memory 201 is used to store an information of a service cell. The service cell is referred as a cell which has radio uplink signaling with the communication device 109 for providing its call or telecommunication service. The service may be a macrocell or femtocell. The timer 202 may be used to suspend the occurrence of relocation mechanism as the communication device 109 is out the service range of the service cell. Before the timer 202 expires, it is detecting whether available femtocells are for serving or not, by the communication module 204. The communication module 204, for example RF module, is used for data transmission and exchange with the service cell. The persons skilled in the art should be realized that the communication module may comprise an antenna and a transceiver to receive or transmit signals. Moreover, the communication module 204 may also comprise CODEC, DSP and digital to analog converter for signals processing. However, the communication module 204 is not the main feature of the present invention, and for the simple purpose, the detailed description is omitted.

Figure 3A:
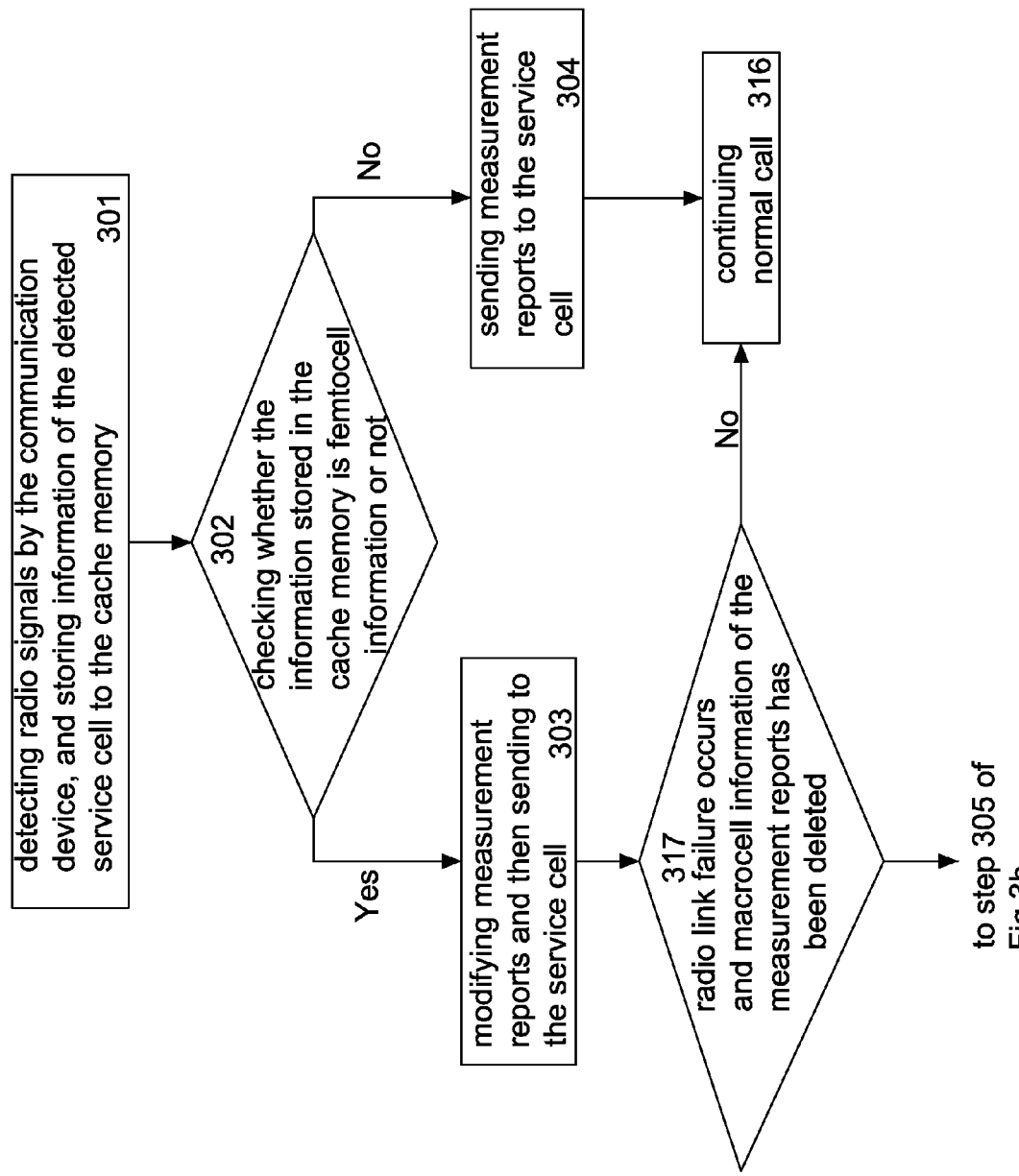
FIG. 3a and FIG. 3b show a preferred embodiment of a method for reducing the handover frequency in femtocell networks.
Figure 3B:
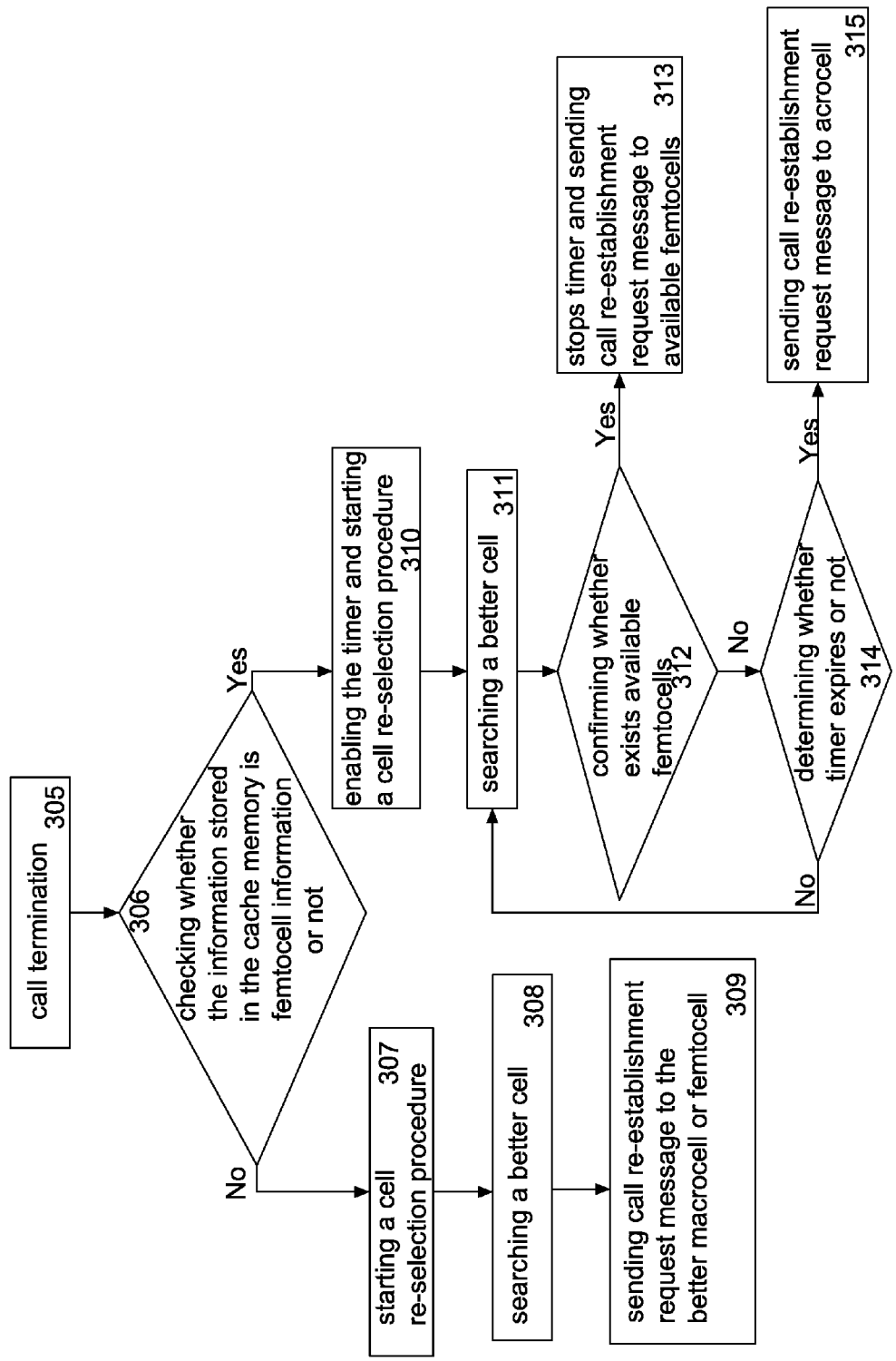

Referring to FIG. 3a and FIG. 3b, they show a preferred embodiment of a method for reducing the handover frequency in femtocell networks. The steps of the method are described as below. Firstly, in step 301, periodically measuring radio signals strength of adjacent cells is performed by utilizing a measurement module of a communication device, and then information of a service cell is stored to a cache memory. The service cell indicates a cell uplink signaling with the communication device. Next, in step 302, utilizing the processor of the communication device, it is performing to check whether the information stored in the cache memory is classified as femtocell information or not. If it is, then proceeding to step 303, modifying measurement reports by the communication device and then sending to the service cell. In general, after the macrocell information of the measurement reports is deleted, sending to the service cell is then proceeded. Thus, the service cell will indicate that only femtocells exist around the communication devices, without the macrocell. If not, the stored information of the cache memory does not belong to femtocell, then proceeding to step 304, sending measurement reports by the communication device to the service cell, without modifying. In other words, in such situation, based-on measurement reports, the service cell realizes that femtocells and/or macrocells exist around the communication devices for providing usage. In step 316, as the communication device still keeps radio linking with the service cell, it will continue the normal call.

However, if radio link failure (temporarily disabled) between the communication device and the service cell occurs and macrocell information of the measurement reports has been deleted (in step 317) to result in call termination/interruption (in step 305), then proceeding to step 306, checking by the communication device whether the information stored in the cache memory is classified as femtocell information or not. If it is not, then proceeding to step 307, it performs a process of starting a cell re-selection procedure, and followed by step 308, searching a better cell by the communication device, for example but not limited, femtocells or macrocells. Subsequently, in step 309, it is performing a process of sending a call re-establishment request message to the better macrocell or femtocell for facilitating re-built calling. In other words, in such situation, if the detected signal of the macrocell is better, then proceeding a call service by thereof, otherwise, if the detected signal of the femtocell is better than that of the macrocell, then providing a call service by the femtocell.

Back to the step 306, if the information stored in the cache memory is classified as femtocell information, then proceeding to step 310, enabling the timer by the communication device, and starting a cell re-selection procedure. Subsequently, in step 311, before the timer expires, searching a better cell by the communication device. Next, in step 312, it is detecting (confirming) by the communication device whether exists available femtocells. The "available" represents its signal strength of the femtocell higher than a predetermined threshold to provide call service for the communication device. If it is, then proceeding to step 313, utilizing the communication device, it is performing to stop the timer and send call re-establishment request message to available femtocells for re-establishing a call. If it is not, then proceeding to step 314, determining whether the timer expires or not. If it is, then proceeding to step 311, continuously searching a better cell; if it is not, then proceeding to step 315, sending call re-establishment request message by the communication device to a macrocell for re-establishing a call.

As above-mentioned, in the present invention, if the communication device temporarily leaves service range of the initial femtocell and back to the service range prior to expiration of the timer, then the initial femtocell continuously serving without any relocation mechanism, and therefore effectively eliminating delay time of handover and reducing bandwidth burden of the macrocell, and effectively utilizing the femtocell for enhancing the overall volume of network services.

Figure 4:
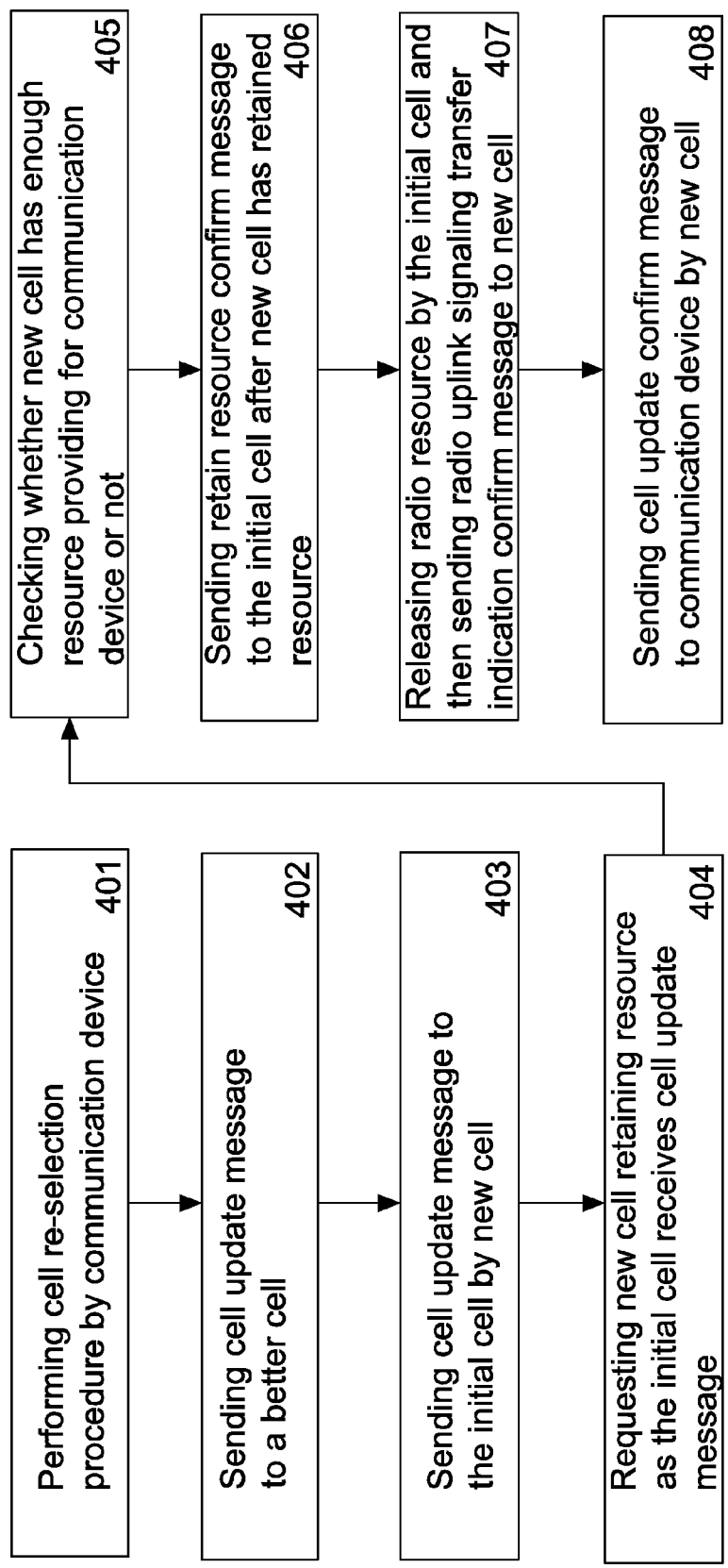
FIG. 4 shows a method for a call re-building of the present invention.

Referring to FIG. 4, it shows a method for a call re-establishment of the present invention. The steps of the method are described as followings. Firstly, in step 401, it is performing a process of cell re-selection procedure by the communication device to search a better cell with best signal. Next, in step 402, sending a cell update message to the better cell by utilizing the communication device is performed as the communication device has found the better cell. In order to facilitate concise description, the better cell is referred to as a new cell and the initial femtocell is referred to as an old cell, in the following. Subsequently, in step 403, it performing a process of sending the cell update message to the old (initial) cell by the new cell. For example, the new cell searched by the communication device may send a radio Uplink Signaling Transfer Indication with the cell update message to the old (initial) cell. Next, in step 404, the new cell is requested for retaining resource to serve the communication device as the old (initial) cell receives the cell update message. Subsequently, in step 405, it is performing a process of checking whether the new cell has enough resource providing for the communication device or not as the new cell receives the request. If it is "yes", then proceeding to step 406, sending retain resource confirm message to the old (initial) cell after the new cell has retained resource. Then, in step 407, after the old (initial) cell receives the retain resource confirm message, it performs a process of releasing radio resource by the old (initial) cell and then sending a radio uplink signaling transfer indication confirm message to the new cell. Finally, in step 408, it performing a process of sending the cell update confirm message to the communication device by the new cell to accomplish the call re-establishment procedure.

As will be understood by persons skilled in the art, the foregoing preferred embodiment of the present invention illustrates the present invention rather than limiting the present invention. Having described the invention in connection with a preferred embodiment, modifications will be suggested to those skilled in the art. Thus, the invention is not to be limited to this embodiment, but rather the invention is intended to cover various modifications and similar arrangements included within the spirit and scope of the appended claims, the scope of which should be accorded the broadest interpretation, thereby encompassing all such modifications and similar structures. While the preferred embodiment of the invention has been illustrated and described, it will be appreciated that various changes can be made without departing from the spirit and scope of the invention.

What is claimed is:

1. A method for reducing the handover frequency in femtocell networks, comprising:
   detecting radio signals of a cell by a communication device, and storing an information of a service cell to a cache memory of said communication device;
   confirming said information stored in said cache memory is femtocell information, and modifying a measurement report and deleting at least one macrocell information to be measured;
   if occurring a call termination, then confirming by said communication device said information stored in said cache memory is femtocell information, and followed by performing the following steps;
   enabling a timer by said communication device; and
   before said timer expires, searching an available cell by said communication device for re-establishing said call.

2. A method in claim 1, wherein said call termination is radio link failure between said communication device and said service cell occurs and said macrocell information of said measurement report has been deleted.

3. A method in claim 1, if said timer expires and none said available cell to be detected, then sending a call re-establishment request message by said communication device to a macrocell for re-establishing a call.

4. A method in claim 1, further comprising a step, as said call termination, if said information stored in said cache memory is not femtocell information, then searching a better cell by said communication device.

5. A method in claim 4, wherein said better cell comprises a femtocell or a macrocell.

6. A method in claim 1, wherein step of said call re-establishment comprises;
   sending a cell update message by said communication device to said available cell;
   sending said cell update message to said service cell by utilizing said available cell;
   requesting for retaining resource of said available cell by said service cell;
   checking whether said available cell has enough resource providing for said communication device or not;
   if it is, then said available cell retains said resource, and sending a retain resource confirm message to said service cell;
   after said service cell receiving said retain resource confirm message, releasing radio resource by said service cell, and then sending a radio uplink signaling transfer indication confirm message to said available cell; and
   sending a cell update confirm message to said communication device by said available cell.

7. A method in claim 6, wherein said cell update confirm message is contained in a radio uplink signaling transfer indication by said available cell, and sending to said service cell.

8. A method in claim 1, wherein signal strength of said available cell is higher than a threshold for serving said communication device.

9. A communication device for reducing the handover frequency in femtocell networks, comprising:
- a measurement module, for detecting a radio signal of cells around a communication device;
- a cache memory, used to store an information of a service cell of said cells;
- a control unit, checking said information stored in said cache memory, if said service cell is a femtocell, modifying a measurement report and deleting detected at least one macrocell information;
- a timer, enabling to time as a call termination, before said timer expires, detecting by said measurement module whether exists an available femtocell for re-establishing a call.

10. A device in claim 9, wherein said call termination is radio link failure between said communication device and said service cell occurs and said macrocell information of said measurement report has been deleted.

11. A device in claim 9, if said timer expires and none said available cell to be detected, then sending a call re-establishment request message to a macrocell for re-establishing a call.

12. A device in claim 9, further comprising a step, as said call termination, if said information stored in said cache memory is not femtocell information, then searching a better cell by said communication device.

13. A device in claim 12, wherein said better cell comprises a femtocell or a macrocell.

* * * * *